(12) United States Patent
Lee

(10) Patent No.: US 11,274,728 B2
(45) Date of Patent: Mar. 15, 2022

(54) MOUNTING STRUCTURE AND COOLING FAN

(71) Applicant: FANUC CORPORATION, Yamanashi (JP)

(72) Inventor: SeungJun Lee, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 114 days.

(21) Appl. No.: 16/108,685

(22) Filed: Aug. 22, 2018

(65) Prior Publication Data
US 2019/0063545 A1 Feb. 28, 2019

(30) Foreign Application Priority Data
Aug. 24, 2017 (JP) .............................. JP2017-161067

(51) Int. Cl.
| | | |
|---|---|---|
| *F04D 29/34* | (2006.01) | |
| *F16F 15/073* | (2006.01) | |
| *H02K 7/00* | (2006.01) | |
| *F04D 29/66* | (2006.01) | |
| *F04D 29/20* | (2006.01) | |
| *F04D 25/08* | (2006.01) | |

(Continued)

(52) U.S. Cl.
CPC .......... *F16F 15/073* (2013.01); *F04D 25/082* (2013.01); *F04D 29/054* (2013.01); *F04D 29/20* (2013.01); *F04D 29/668* (2013.01); *F16F 15/085* (2013.01); *H02K 7/003* (2013.01); *H02K 9/06* (2013.01); *F04D 29/052* (2013.01); *F04D 29/056* (2013.01)

(58) Field of Classification Search
CPC .......... F16F 1/3732; F16F 1/3737; F16F 1/40; F16F 1/445; F16F 15/08; F16F 15/085; F04D 29/34

USPC ....................................................... 416/134 R
See application file for complete search history.

(56) References Cited

U.S. PATENT DOCUMENTS

| | | | | | |
|---|---|---|---|---|---|
| 1,613,232 | A | * | 1/1927 | Loutrel | ................... F16B 39/24 411/157 |
| 2,126,708 | A | * | 8/1938 | Schmidt | .................... F16F 1/38 267/280 |

(Continued)

FOREIGN PATENT DOCUMENTS

| | | |
|---|---|---|
| CN | 1485549 A | 3/2004 |
| CN | 102414469 A | 4/2012 |

(Continued)

OTHER PUBLICATIONS

English Machine Translation for German Publication No. 20015848 U1, published Dec. 28, 2000, 28 pgs.

(Continued)

*Primary Examiner* — Bradley T King
(74) *Attorney, Agent, or Firm* — Fredrikson & Byron, P.A.

(57) ABSTRACT

A mounting structure for mounting a first member and a second member on each other forming a device such as a cooling fan or the like. The mounting structure is equipped with a rubber joining member provided between the first member and the second member, having a curing property and joining the first member and the second member, and a first metal member provided on the first member on a side opposite to the joining member and having an elastic force restricting the relative movement of the first member to the second member.

15 Claims, 9 Drawing Sheets

(51) Int. Cl.
*F16F 15/08* (2006.01)
*F04D 29/054* (2006.01)
*H02K 9/06* (2006.01)
*F04D 29/052* (2006.01)
*F04D 29/056* (2006.01)

(56) References Cited

U.S. PATENT DOCUMENTS

| | | | | |
|---|---|---|---|---|
| 2,207,831 | A * | 7/1940 | Sherman | F16C 35/02 403/227 |
| 2,653,459 | A * | 9/1953 | Morrill | F04D 29/34 464/92 |
| 2,802,353 | A * | 8/1957 | Peirce | F04D 29/263 464/91 |
| 2,879,090 | A * | 3/1959 | Everitt | F16F 3/0873 403/227 |
| 3,089,314 | A * | 5/1963 | Speaker | F04D 29/34 62/279 |
| 3,250,939 | A * | 5/1966 | Dayton | H01K 1/46 313/113 |
| 4,031,936 | A * | 6/1977 | Curtis | F16B 39/26 411/134 |
| 4,601,602 | A * | 7/1986 | Schnitzler | B62D 7/16 403/56 |
| 5,061,778 | A * | 10/1991 | Uchida | C08G 18/4216 528/45 |
| 5,110,081 | A * | 5/1992 | Lang, Jr. | F16F 3/0873 248/635 |
| 5,366,178 | A * | 11/1994 | Hsiong | F42B 10/46 244/3.16 |
| 6,210,117 | B1 * | 4/2001 | Bucher | F04D 25/088 416/210 R |
| 6,352,411 | B1 * | 3/2002 | Bucher | F04D 25/088 403/302 |
| 6,367,819 | B1 * | 4/2002 | Andersen | A63C 17/0093 280/11.27 |
| 6,446,979 | B1 * | 9/2002 | Steinetz | F16J 15/065 277/630 |
| 6,585,488 | B1 * | 7/2003 | Bucher | F04D 25/088 416/210 R |
| 6,821,091 | B2 * | 11/2004 | Lee | F04D 25/088 416/206 |
| 2003/0099545 | A1 * | 5/2003 | Liang | F04D 25/088 416/210 R |
| 2013/0037655 | A1 * | 2/2013 | Bradley | B64C 7/00 244/124 |
| 2015/0295472 | A1 | 10/2015 | Kuraishi | |

FOREIGN PATENT DOCUMENTS

| | | |
|---|---|---|
| DE | 20015848 U1 | 12/2000 |
| DE | 69808147 T2 | 2/2004 |
| DE | 102016201560 A1 | 8/2017 |
| JP | 4522576 Y1 | 9/1970 |
| JP | 5922313 U | 2/1984 |
| JP | 6233497 A | 8/1994 |
| JP | 737406 A | 2/1995 |
| JP | 2007151379 A | 6/2007 |
| JP | 2015204641 A | 11/2015 |

OTHER PUBLICATIONS

English Abstract and Machine Translation for German Publication No. 102016201560 A1, published Aug. 3, 2017, 21 pgs.
English Abstract and Machine Translation for German Publication No. 69808147 T2, published Feb. 19, 2004, 27 pgs.
Cordier et al., "Self-Healing and Thermoreversible Rubber from Supramolecular Assembly," Nature, vol. 451, Issue 7181, 2008, pp. 977-980.
Partial English Translation for Japanese Publication No. JPS45-022576 Y1, published Sep. 7, 1970, 2 pgs.
English Machine Translation for Japanese Publication No. JPS59-22313 U, published Feb. 10, 1984, 6 pgs.
English Abstract and Machine Translation for Japanese Publication No. JPH07-037406 A, published Feb. 7, 1995, 9 pgs.
English Abstract for Japanese Publication No. 2015204641 A, published Nov. 16, 2015, 1 pg.
English Abstract and Machine Translation for Japanese Publication No. 2007-151379 A, published Jun. 14, 2007, 19 pgs.
English Abstract and Machine Translation for Japanese Publication No. 06-233497 A, published Aug. 19, 1994, 6 pgs.
English Abstract and Machine Translation for Chinese Publication No. 1485549 A, published Mar. 31, 2004, 7 pgs.
English Abstract and Machine Translation for Chinese Publication No. 102414469 A, published Apr. 11, 2012, 12 pgs.

\* cited by examiner

MOUNTING STRUCTURE AND COOLING FAN

CROSS-REFERENCE TO RELATED APPLICATION

This application is based upon and claims the benefit of priority from Japanese Patent Application No. 2017-161067 filed on Aug. 24, 2017, the contents of which are incorporated herein by reference.

BACKGROUND OF THE INVENTION

Field of the Invention

The present invention relates to a mounting structure for mounting a first member and a second member on each other and a cooling fan having the mounting structure.

Description of the Related Art

In various machines such as machine tools, industrial machinery and the like, an electric motor is mounted for rotating a rotational shaft such as a feed shaft, a main spindle or the like. A cooling fan is mounted on the electric motor and forcibly cools the electric motor for improving heat dissipation from the surface of the electric motor to improve the characteristic of a continuous rated torque or the like.

However, there may be the case that large vibration is applied to the cooling fan due to vibration transmission to the cooling fan through the electric motor when vibrations are generated on the machine during machining operations, conveyance operations or the like.

In Japanese Laid-Open Patent Publication No. 2015-204641, it is disclosed to mount a cooling fan on an electric motor by interposing, between a ventilation cover of the electric motor and the cooling fan, a base plate having female screw portions, a fan mounting plate and a cylindrical vibration-proof material made of rubber and then by screw-engaging bolts inserted through the vibration-proof material with the female screw portions.

SUMMARY OF THE INVENTION

In the case where vibration transmitted to a cooling fan is suppressed by the use of a vibration-proof material as is done in the mounting structure disclosed in Japanese Laid-Open Patent Publication No. 2015-204641, there is a concern about deterioration in vibration suppression because of degradation of the vibration proofing material over time depending on the ambient environment. Further, vibration-resistance effect cannot be obtained easily because the vibration-proof material is fastened by the screw-engaging bolts and the female screw portions.

To solve this problem, a method of improving the vibration resistance of the cooling fan is brought out by increasing the rigidity of the cooling fan itself and the mounting rigidity of the cooling fan on the electric motor. In this case, it is possible to increase the rigidity of components of the cooling fan by using a high-strength material, increasing its dimensions or adding a reinforcing member. However, these methods result in a high cost, an increase in the dimensions of the cooling fan and an increase in weight. As a result, it becomes unable to balance the electric motor with the cooling fan in dimension or weight.

Therefore, an object of the present invention is to provide a mounting structure capable of suppressing vibration transmitted from the outside in a simple configuration. Further, another object of the present invention is to provide a cooling fan using such a mounting structure.

In a first mode, the present invention is a mounting structure for mounting a first member and a second member on each other. The mounting structure is equipped with a rubber joining member provided between the first member and the second member, having a curing property and joining the first member and the second member, and a first metal member provided on the first member on a side opposite to the joining member and having an elastic force to restrict a movement of the first member relative to the second member.

In a second mode, the present invention is a mounting structure for mounting a first member and a second member on each other, with a portion of the first member inserted into the second member. The mounting structure is equipped with a rubber joining member provided between the first member and the second member, having a curing property, and joining the first member and the second member and is also equipped with a metal member provided between the first member and the second member at a portion where the joining member is not provided, and having an elastic force to restrict relative movement of the first member to the second member in an axial direction of the first member.

In a third mode, the present invention is a cooling fan having the mounting structure in the first mode or the second mode.

According to the present invention, it is possible to suppress (absorb) vibration transmitted from the outside in a simple configuration.

The above and other objects, features, and advantages of the present invention will become more apparent from the following description when taken in conjunction with the accompanying drawings in which preferred embodiments of the present invention are shown by way of illustrative examples.

DESCRIPTION OF THE PREFERRED EMBODIMENTS

Figure 1A:
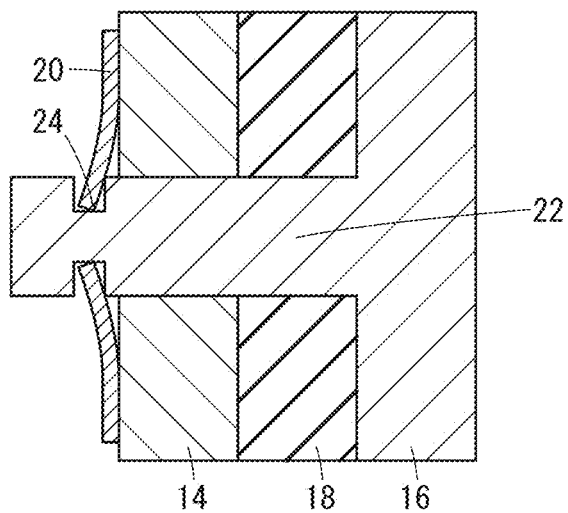
FIG. 1A is a cross-sectional view of a mounting structure in a first embodiment of the present invention.

Hereafter, a mounting structure and a cooling fan according to the present invention will be described in detail based on preferred embodiments with reference to the accompanying drawings.

First Embodiment

A mounting structure 10A in a first embodiment will be described with reference to FIG. 1A.

The mounting structure 10A is a mounting structure for mounting a first member 14 and a second member 16 on each other that configure various devices such as a cooling fan 12 referred to later (see FIGS. 6A, 6B and 8A to 9B) and the like.

Specifically, the mounting structure 10A is equipped with a rubber joining member 18 provided between the first member 14 and the second member 16, having a curing property and joining the first member 14 and the second member 16. The mounting structure 10A is also equipped with a first metal member 20 provided on the first member 14 on a side opposite to the joining member 18 and having an elastic force for restricting the movement of the first member 14 relative to the second member 16. The joining member 18 absorbs vibration having been transmitted from the outside to the first member 14 to suppress the vibration transmitted to the second member 16 or absorbs vibration having been transmitted from the outside to the second member 16 to suppress the vibration transmitted to the first member 14.

The second member 16 is provided with a columnar support member 22 piercing the joining member 18 and the first member 14. A groove 24 is formed on an outer peripheral surface of a distal end portion of the support member 22 extending to pierce the first member 14. The first metal member 20 is fastened to the support member 22 by being fitted in the groove 24. A portion of the first metal member 20 is in abutment on the first member 14 on the side opposite to the joining member 18 and presses the first member 14 toward the joining member 18 and second member 16 by the elastic force of the first metal member 20. Therefore, the movement of the first member 14 relative to the second member 16 is restricted, and the vibration having been transmitted from the outside to the first member 14 is absorbed by the first metal member 20, so that the vibration transmitted to the second member 16 is suppressed. Alternatively, the vibration having been transmitted from the outside to the second member 16 is absorbed by the first metal member 20, so that the vibration transmitted to the first member 14 is suppressed.

Here, the first member 14 and the second member 16 may be any shapes, dimensions or materials as long as they are able to be joined by the joining member 18.

Further, the joining member 18 is a rubber elastic member which is in a liquid state when applied to the first member 14 or the second member 16 to stick the first member 14 and the second member 16 together and which is thereafter cured to join the first member 14 and the second member 16. That is, the joining member 18 is a rubber member having a physical property capable of curing by itself and is used for securing vibration proof, vibration resistance and damping properties of the first member 14 and the second member 16. As a joining member 18 like this, it is possible to use an adhesive seal, a liquid gasket or elastic adhesive including, for example, a silicone-based, urethane-based or rubber-based material. By using an adhesive seal, a liquid gasket or elastic adhesive as the joining member 18, it is possible to join the first member 14 and the second member 16 simply and easily and, at the same time, to absorb vibration even in a case where a shape between the first member 14 and the second member 16 is complicated and thus makes it difficult to secure a joining portion. It is possible to use, as the joining member 18, a double-sided tape having adhesive parts made of elastic adhesive on both sides thereof.

Further, the first metal member 20 is an elastic member made of metal, fastening the first member 14 and the second member 16, and is provided to reinforce the joining force between the first member 14 and the second member 16 by the joining member 18. Accordingly, in the mounting structure 10A, the first member 14 and the second member 16 are fastened by respective elastic forces of the joining member 18 and the first metal member 20 in combination. As the first metal member 20, it is possible to use, for example, a leaf spring, a snap ring or a holder spring. FIG. 1A shows an example of the first metal member 20 as a snap ring, such as a retaining ring or a holder spring.

Still further, the support member 22 may be formed integrally with the second member 16 or may be another member separated from the second member 16. In the case of being another member separated from the second member 16, the support member 22 may be different in material from the second member 16.

According to the mounting structure 10A in the first embodiment, by the combination of the rubber joining member 18 having a curing property and the first metal member 20 having an elastic force, it is possible for the joining member 18 and the first metal member 20 to absorb the vibration having been transmitted to the first member 14 or the second member 16. Thus, it is possible to suppress (absorb) vibration transmitted from the outside in a simple configuration, and hence, it is possible to secure vibration-proof, vibration resistance and damping properties. Further, the first metal member 20 makes it possible to reinforce the joining force between the first member 14 and the second member 16 by the joining member 18. That is, by the joining member 18 and the first metal member 20, it is possible to increase the fastening force (joining force) between the first member 14 and the second member 16 and the capability of absorbing the vibration.

Modifications of First Embodiment

Next, modifications (first to seventh modifications) of the mounting structure 10A in the first embodiment will be described with reference to FIGS. 1B to 4B. Incidentally, in the first to seventh modifications, those identical with or similar to the components of the mounting structure 10A shown in FIG. 1A will be given the same reference numerals and will be omitted from being described in detail.

<First Modification>

Figure 1B:
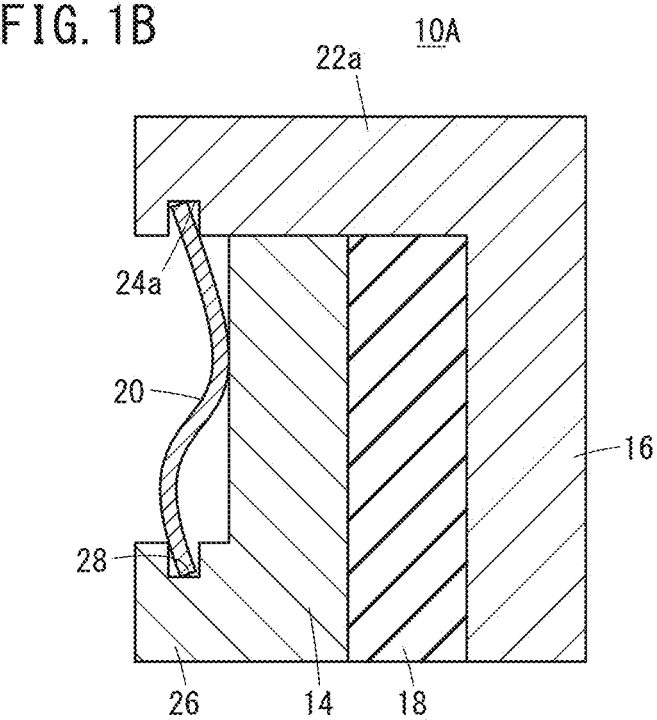
FIG. 1B is a cross-sectional view of a first modification of the mounting structure shown in FIG. 1A.

In the first modification shown in FIG. 1B, a support member 22a extends from one end portion of the second member 16 to a side of the first member 14 opposite to the joining member 18 along side surfaces of the joining member 18 and the first member 14. On the side of the first member 14 opposite to the joining member 18, there is provided a support portion 26 extending from the first member 14 in a direction away from the joining member 18. The support portion 26 is formed with a groove 28 facing a groove 24a of the support member 22a. In this case, since both ends of the first metal member 20 are respectively fitted in both the grooves 24a, 28, the first metal member 20 is fastened to the support member 22a and the support portion 26. FIG. 1B shows an example of the first metal member 20 as a leaf spring in abutment on the first member 14 on the side opposite to the joining member 18 to restrict the movement of the first member 14 relative to the second member 16.

The same effect as that of the configuration shown in FIG. 1A can be obtained even in the first modification. Further, because the support member 22a is provided at one end portion of the second member 16, a connected area between the first member 14 and the joining member 18 and a connected area between the second member 16 and the joining member 18 can be widened in comparison with those in the configuration shown in FIG. 1A. Therefore, the joining force of the joining member 18 with the first member 14 and the second member 16 becomes large. As a result, it is possible for the joining member 18 and the first metal member 20 to effectively absorb vibration from the outside.

<Second Modification>

Figure 2A:
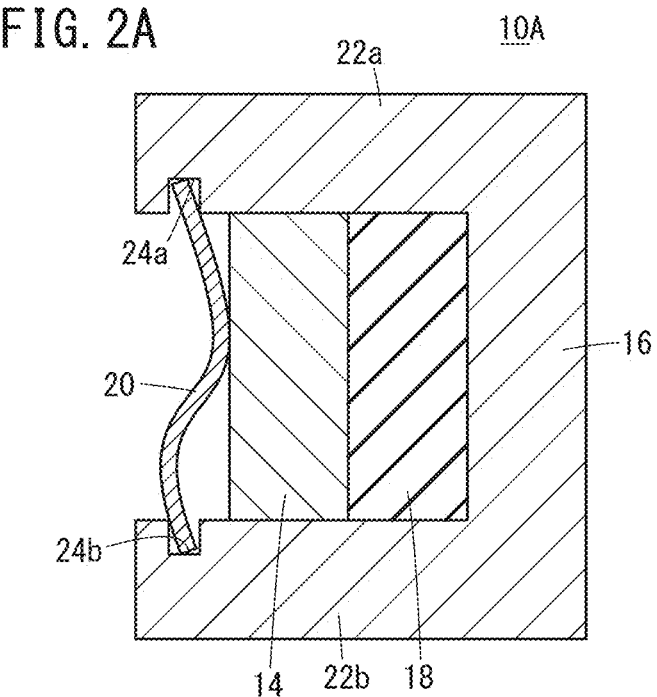
FIG. 2A is a cross-sectional view of a second modification of the mounting structure shown in FIG. 1A.

In a second modification shown in FIG. 2A, the second member 16 is provided with one support member 22a extending from one end portion of the second member 16 and another support member 22b extending from the other end portion of the second member 16 to a side of the first member 14 opposite to the joining member 18 along the side surfaces of the joining member 18 and the first member 14. Accordingly, the two support members 22a, 22b extend from both end portions of the second member 16. In this case, the other support member 22b is formed with a groove 24b facing a groove 24a of the one support member 22a. Accordingly, because both ends of the first metal member 20 are respectively fitted in the two grooves 24a, 24b, the first metal member 20 is fastened to the two support members 22a, 22b.

In the second modification, the same effects as those in the configurations shown in FIGS. 1A and 1B can be obtained by the configuration described above. Further, because the both ends of the first metal member 20 are fastened to the two support members 22a, 22b extending from the second member 16, the fastening force (joining force) between the first member 14 and the second member 16 is improved in comparison with that in the first modification shown in FIG. 1B.

<Third Modification>

Figure 2B:
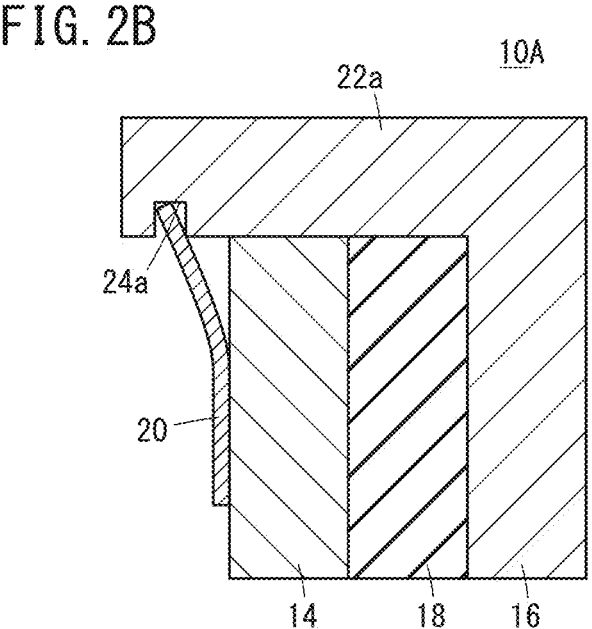
FIG. 2B is a cross-sectional view of a third modification of the mounting structure shown in FIG. 1A.

A third modification shown in FIG. 2B differs from the second modification shown in FIG. 2A in a point that the second member 16 is provided with the one support member 22a only and that the first metal member 20 is fastened to the support member 22a. Accordingly, in the third modification, it is possible for the joining member 18 and the first metal member 20 to absorb vibration from the outside in a simpler configuration compared with that of the second modification.

<Fourth Modification>

Figure 3A:
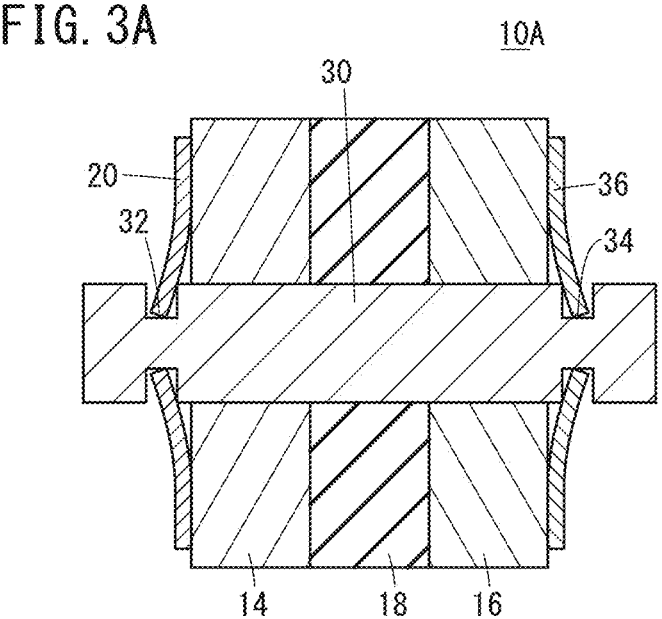
FIG. 3A is a cross-sectional view of a fourth modification of the mounting structure shown in FIG. 1A.

A fourth modification shown in FIG. 3A differs from the configurations shown in FIGS. 1A to 2B in a point that the mounting structure 10A has a columnar penetrating member 30 penetrating through the first member 14, the joining member 18 and the second member 16.

A first groove 32 is formed at one end portion of the penetrating member 30 protruding from the first member 14 in a direction away from the joining member 18. The first metal member 20 is fitted in the first groove 32 to be fastened to the penetrating member 30.

A second groove 34 is formed at the other end portion of the penetrating member 30 protruding from the second member 16 in a direction away from the joining member 18. A second metal member 36 fitted in the second groove 34 to be fastened to the penetrating member 30 is provided on the second member 16 on a side opposite to the joining member 18. The second metal member 36 is an elastic member made of metal, fastening the first member 14 and the second member 16 in cooperation with the first metal member 20. The second metal member 36 takes the same configuration as the first metal member 20 and is provided for reinforcing the joining force between the first member 14 and the second member 16 by the joining member 18. FIG. 3A shows an example of the second metal member 36 as a snap ring, such as a retaining ring or a holder spring.

In this case, the first metal member 20 is in abutment on the first member 14 on the side opposite to the joining member 18 and presses the first member 14 toward the joining member 18 and the second member 16 by the elastic force of the first metal member 20. On the other hand, the second metal member 36 is in abutment on the second member 16 on the side opposite to the joining member 18 and presses the second member 16 toward the joining member 18 and the first member 14 by the elastic force of the second metal member 36. Thus, the relative movement between the first member 14 and the second member 16 is restricted by the first metal member 20 and the second metal member 36. At the same time, vibration having been transmitted from the outside to the first member 14 is absorbed by the first metal member 20, and thus, vibration transmitted to the second member 16 is suppressed. Alternatively, vibration having been transmitted to the second member 16 is absorbed by the second metal member 36, and thus, vibration transmitted to the first member 14 is suppressed.

The penetrating member 30 may be a member of any material as long as the penetrating member 30 is able to support the first metal member 20 and the second metal member 36.

As described above, in the fourth modification, the first metal member 20 is fastened to the first groove 32 of the penetrating member 30, and the second metal member 36 is fastened to the second groove 34. Therefore, the fastening force between the first member 14 and the second member 16 and the capability of absorbing vibration are further increased in comparison with those in the configurations shown in FIGS. 1A to 2B.

<Fifth Modification>

Figure 3B:
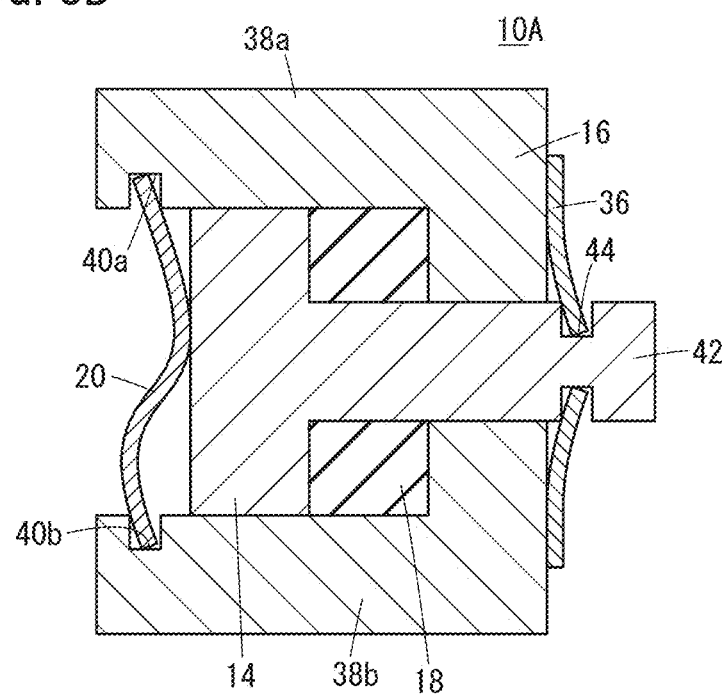
FIG. 3B is a cross-sectional view of a fifth modification of the mounting structure shown in FIG. 1A.

In a fifth modification shown in FIG. 3B, like the second modification shown in FIG. 2A, two first support members 38a, 38b respectively extend from both end portions of the second member 16 to a side of the first member 14 opposite to the joining member 18 along the side surfaces of the joining member 18 and the first member 14. First grooves 40a, 40b are formed to face each other at respective end portions on the first member 14 side of the two first support members 38a, 38b. The first metal member 20 is fastened to the two first support members 38a, 38b by being fitted in the two first grooves 40a, 40b and is in abutment on the first member 14 on the side opposite to the joining member 18.

Further, in the fifth modification, the first member 14 is provided with a columnar second support member 42 penetrating the joining member 18 and the second member 16 and extending to a side of the second member 16 opposite to the joining member 18. A second groove 44 is formed on an outer peripheral surface of an end portion of the second support member 42 penetrating the second member 16. The second metal member 36 is fastened to the second support member 42 by being fitted in the second groove 44 and is in abutment on the second member 16 on the side opposite to the joining member 18.

In the fifth modification, the same effects as those of the fourth modification shown in FIG. 3A can be obtained by the aforementioned configuration. Incidentally, the two first support members 38a, 38b may also be formed integrally with the second member 16 or may be members separated from the second member 16. In the case of the members separated from the second member 16, two first support members 38a, 38b may differ in material from the second member 16. The second support member 42 may also be formed integrally with the first member 14 or may be a member separated from the first member 14. In the case of the member separated from the first member 14, the second support member 42 may differ in material from the first member 14.

<Sixth Modification>

Figure 4A:
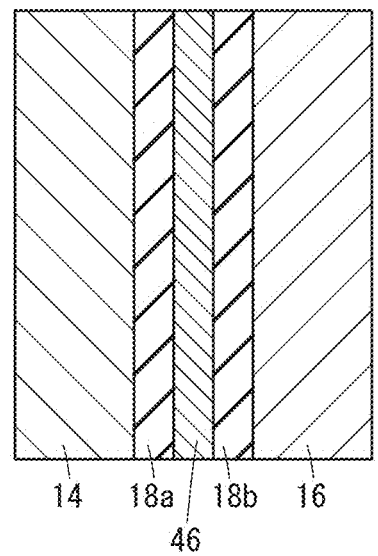
FIG. 4A is a cross-sectional view of a sixth modification of the mounting structure shown in FIG. 1A.

A sixth modification shown in FIG. 4A differs from the configurations shown in FIGS. 1A to 3B in a point that a third member 46 is provided between the first member 14 and the second member 16, and that the first member 14 and the third member 46 are joined by a joining member 18a while the second member 16 and the third member 46 are joined by a joining member 18b.

Even in the sixth modification, it is possible to use the first metal member 20 and the second metal member 36. In this case, the configuration shown in any of FIGS. 1A to 3B may be applied. Further, the third member 46 may be of any shape, dimension or material as long as the third member 46 is able to be joined with the first member 14 and the second member 16 through the joining members 18a, 18b. Further, a base portion of a double-sided tape may be used as the third member 46, and adhesive portions on both surfaces of the base portion may be used as the joining members 18a, 18b.

<Seventh Modification>

Figure 4B:
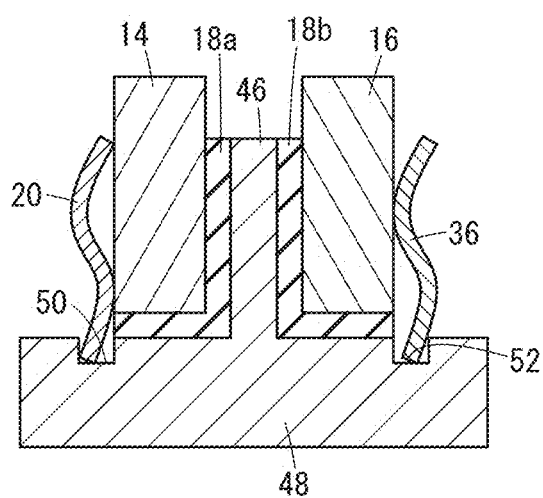
FIG. 4B is a cross-sectional view of a seventh modification of the mounting structure shown in FIG. 1A.

In a mounting structure 10A of a seventh modification shown in FIG. 4B, the third member 46 may be provided with a support member 48 supporting the first metal member 20 and the second metal member 36. The support member 48 is connected to an end portion of the third member 46 and extends along respective side surfaces of the first member 14 and the second member 16. The support member 48 and the first member 14 are joined by the joining member 18a, while the support member 48 and the second member 16 are joined by the joining member 18b.

The first metal member 20 is fastened to the support member 48 by being fitted in a first groove 50 formed on the support member 48 on the first member 14 side. Further, the second metal member 36 is fastened to the support member 48 by being fitted in a second groove 52 formed on the support member 48 on the second member 16 side.

The support member 48 may be formed integrally with the third member 46 or may be a member separated from the third member 46. Furthermore, in the case of being a member separated from the third member 46, the support member 48 may differ in material from the third member 46.

In the seventh modification, the same effects as those of the fourth to sixth modifications shown in FIGS. 3A to 4A can be obtained by the aforementioned configuration.

Second Embodiment

Figure 5A:
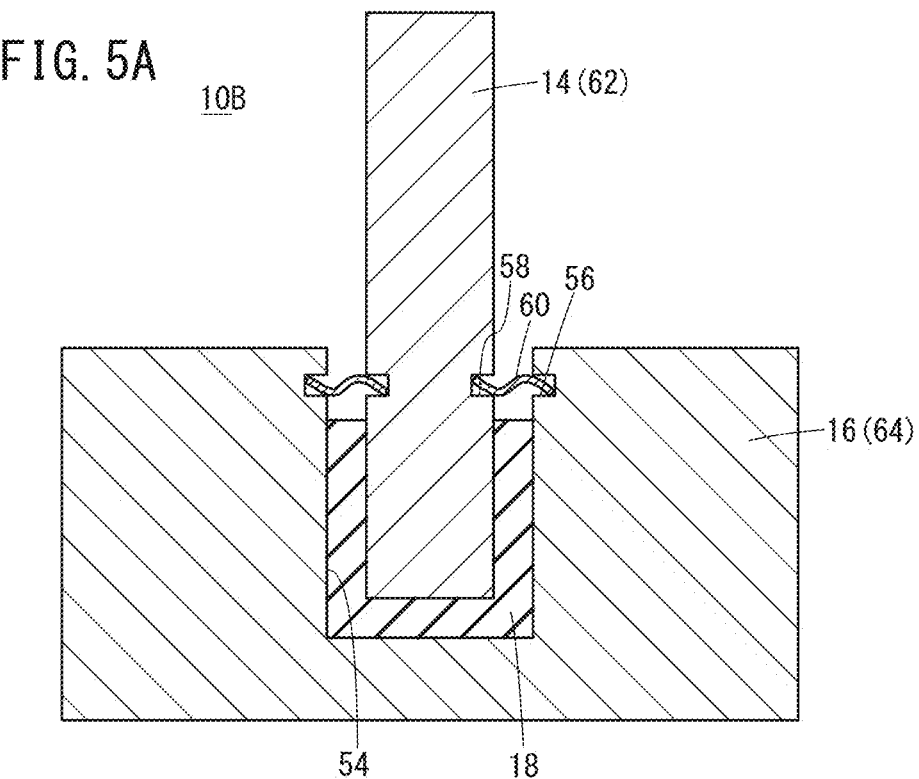
FIG. 5A is a cross-sectional view of a mounting structure in a second embodiment of the present invention.
Figure 5B:
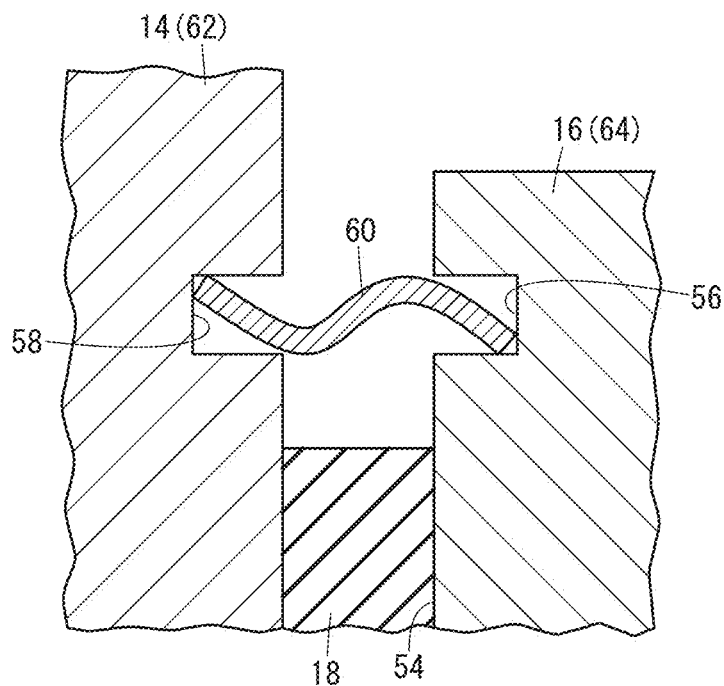
FIG. 5B is a partial cross-sectional view showing in an enlarged scale a metal member and a joining member shown in FIG. 5A.

A mounting structure 10B in a second embodiment will be described with reference to FIGS. 5A and 5B.

In the mounting structure 10B, a portion of a first member 14 is inserted into a hole portion 54 formed in a second member 16, and a joining member 18 connects the inserted first member 14 to an inner wall of the hole portion 54. Furthermore, the inner wall of the hole portion 54 is provided with grooves 56 at places which are not provided with the joining member 18. Furthermore, portions of the first member 14 inserted into the hole portion 54 are formed with grooves 58 facing the grooves 56 of the second member 16 at places where the joining member 18 is not provided. Both ends of each metal portion 60 are fitted in the respective groove 56 and groove 58. Thus, the metal member 60 is fastened to the first member 14 and the second member 16 and restricts relative movement of the first member 14 to the second member 16 in the axial direction of the first member 14.

Due to respective elastic forces of the joining member 18 and the metal member 60, the mounting structure 10B is able to absorb vibration transmitted from the outside to the first member 14 or to the second member 16 by the joining member 18 and the metal member 60. Assuming for example that the first member 14 is a shaft 62 of the cooling fan 12 to be described later (see FIGS. 6A, 6B and 8A to 9B) and that the second member 16 is a case 64 of the cooling fan 12, vibration transmitted from the outside to the shaft 62 or to the case 64 can be absorbed effectively by the joining member 18 and the metal member 60, when the shaft 62 is fixed to the case 64.

Third Embodiment

A mounting structure 10C in a third embodiment will be described with reference to FIGS. 6A to 7.

In the third embodiment, the mounting structure 10A, or 10B (see FIGS. 1A to 5B) of the aforementioned first or second embodiment is applied as a mounting structure 10C for the cooling fan 12. The cooling fan 12 is mounted on an electric motor (not shown) that rotates a rotational shaft (a feed shaft or a main spindle) of a machine such as a machine tool, an industrial machine or the like and has a rotor 66 and a propeller 68 non-rotatably supported on the rotor 66.

Although in the third embodiment, description will be given regarding, as one example, a case that the rotor 66 is an outer rotor, the mounting structure 10C can be applied even in a case of being an inner rotor. Further, in the cooling fan 12, the rotor 66 and the propeller 68 may be rotated by the driving of the electric motor or may be rotated by the driving of a motor built in the cooling fan 12. Accordingly, in the case where the propeller 68 is rotated by the electric motor, the rotor 66 is a part of the electric motor.

The rotor 66 is an outer rotor and is a cylindrical member configured rotatably about an axis of the shaft 62 through a bearing 70 on the shaft 62. That is, the rotor 66 has a cylindrical portion 66a enabling the shaft 62 to extend therethrough and a cylindrical protruding portion 66b protruding upward from the cylindrical portion 66a to support an end portion of the shaft 62 through the bearing 70.

The propeller 68 is mounted on an upper portion of the cylindrical portion 66a of the rotor 66 to be fitted on the protruding portion 66b. The propeller 68 is an impeller having a propeller boss 68a of a cylindrical or disc shape fitted on the protruding portion 66b and a plurality of blades 68b connected to an outer peripheral surface of the propeller boss 68a at a predetermined angle and interval.

The mounting structure 10C is applied to the cooling fan 12 in order to mount the rotor 66 and the propeller 68 on each other and utilizes, for example, the mounting structure 10A shown in FIG. 1A. Incidentally, as long as the propeller 68 is mountable on the rotor 66, it is possible to use any of the mounting structures 10A, 10B as well as the structure shown in FIG. 1A.

In the mounting structure 10C, the first member 14 is the propeller boss 68a of the propeller 68, the second member 16 is the cylindrical portion 66a of the rotor 66, and the support member 22 is the protruding portion 66b. The joining member 18 connects an upper portion of the cylindrical portion 66a with the propeller boss 68a. Further, the groove 24 is formed on the outer peripheral surface of the protruding portion 66b above the propeller boss 68a. Since the first metal member 20 is fitted in the groove 24, the first metal member 20 is fastened to the protruding portion 66b. Therefore, a portion of the first metal member 20 is in abutment on the upper surface of the propeller boss 68a, so that the propeller boss 68a of the propeller 68 is restrained from moving relative to the cylindrical portion 66a of the rotor 66 in the axial direction of the shaft 62.

In the mounting structure 10C of the third embodiment as well as in the cooling fan 12 to which the mounting structure 10C is applied, it is possible to absorb vibration transmitted from the outside to the cooling fan 12 by the joining member 18 and the first metal member 20. Accordingly, the vibration-proof of the cooling fan 12 can be secured.

Further, a moment load is generated on the propeller 68 due to vibration transmitted from the electric motor to the propeller 68 through the rotor 66 and due to the weight and vibration acceleration of the propeller 68. To cope with this, in the third embodiment, the propeller 68 and the rotor 66 are mounted on each other through the mounting structure 10C. Thus, the vibration caused by the moment load is absorbed by the joining member 18 and the first metal member 20, and it is possible to suppress the transmission of vibration to the rotor 66 and the shaft 62. As a result, the rotor 66 and the shaft 62 can prevented from being damaged by the vibration caused by the moment load.

Further, because the mounting structure 10C utilizes the mounting structure 10A shown in FIG. 1A, the effects of the structure shown in FIG. 1A can also be obtained easily.

Needless to say, in the case where the rotor 66 is either an inner rotor or an outer rotor in the cooling fan 12, the aforementioned respective effects can be obtained easily.

Modifications of Third Embodiment

With reference to FIGS. 8A to 9B, description will be given regarding modifications of the mounting structure 10C and the cooling fan 12 to which the mounting structure 10C in the third embodiment is applied.

Figure 8A:
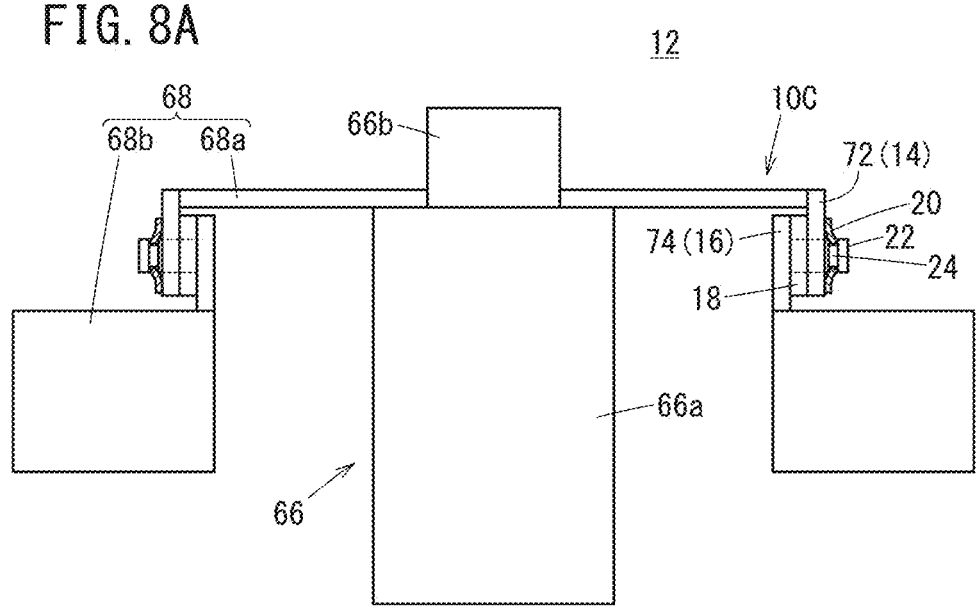
FIG. 8A is a side view of a modification (eighth modification) of the cooling fan shown in FIG. 6A.
Figure 8B:
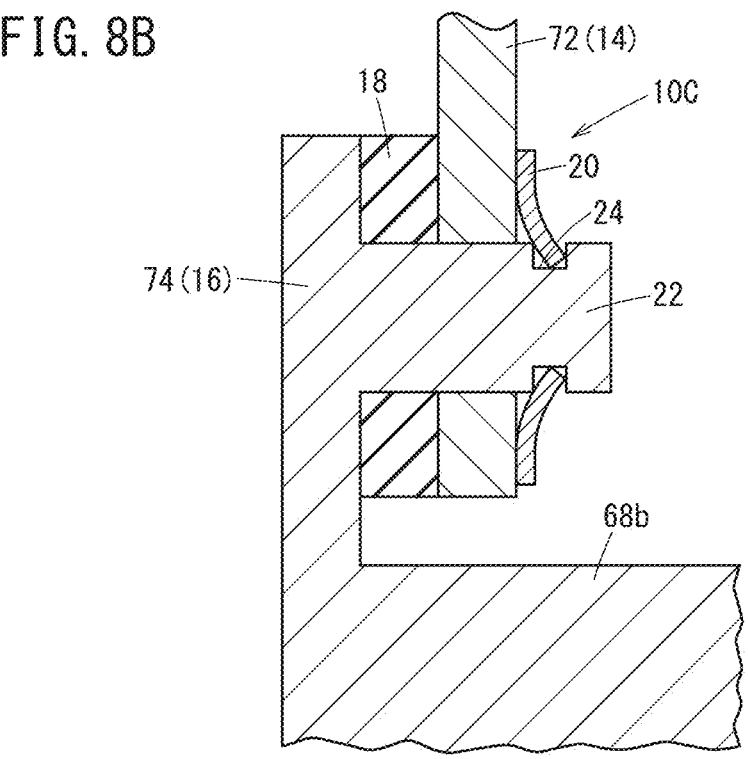
FIG. 8B is a partial cross-sectional view showing in an enlarged scale a portion of the mounting structure shown in FIG. 8A.

In a modification shown in FIGS. 8A and 8B (hereafter, referred to as an eighth modification), a mounting structure 10C is applied to the cooling fan 12 in order to mount the propeller boss 68a of the propeller 68 and the plurality of blades 68b on each other. For example, the mounting structure 10A in the first embodiment shown in FIG. 1A is utilized as the mounting structure 10C.

In the eighth modification, an outer peripheral portion 72 of the propeller boss 68a is configured to extend downward toward the plurality of blades 68b, while inner side portions of the plurality of blades 68b are configured respectively as mounting portions 74 extending upward inside the outer peripheral portion 72 of the propeller boss 68a. The mounting portions 74 are respectively provided with support members 22. The support members 22 each extend in the radial direction of the shaft 62 (see FIG. 6B) from the mounting portion 74 outward through the outer peripheral portion 72 of the propeller boss 68a.

Then, in the eighth modification, the first member 14 is the outer peripheral portion 72 of the propeller boss 68a, and the second member 16 is each of the mounting portions 74 of the plurality of blades 68b. In this case, the joining members 18 respectively join the mounting portions 74 of the plurality of blades 68b with the outer peripheral portion 72 of the propeller boss 68a. Further, the plurality of support members 22 are formed with the grooves 24 at places protruding outward from the outer peripheral portion 72 of the propeller boss 68a. Because the first metal members 20 are fitted in the respective grooves 24, the first metal members 20 are fastened to the support members 22. For this reason, the plurality of first metal members 20 are each partially in abutment against the outer peripheral portion 72 of the propeller boss 68a so that relative movement of the mounting portions 74 of the plurality of blades 68b is restricted with respect to the outer peripheral portion 72 of the propeller boss 68a in the axial directions of the respective shafts 62.

Figure 9A:
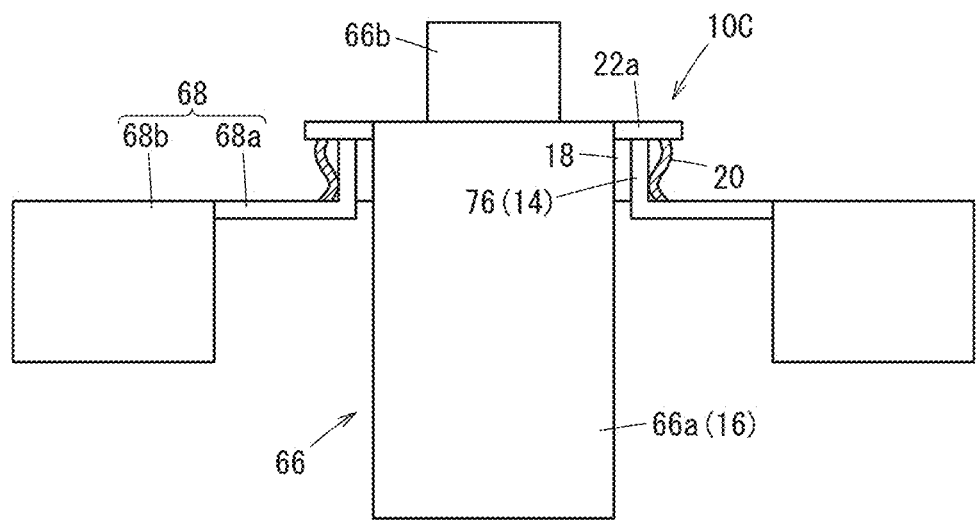
FIG. 9A is a side view of another modification (ninth modification) of the cooling fan shown in FIG. 6A.
Figure 9B:
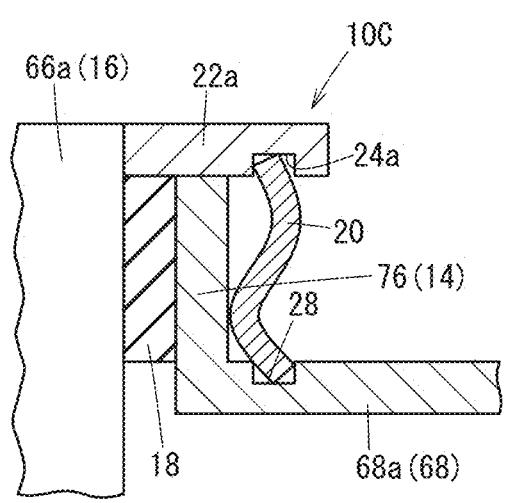
FIG. 9B is a partial cross-sectional view showing in an enlarged scale a portion of the mounting structure shown in FIG. 9A.

In a modification shown in FIGS. 9A and 9B (hereafter also referred to as a ninth modification), the mounting structure 10C is applied to the cooling fan 12 in order to mount the propeller boss 68a of the propeller 68 and the cylindrical portion 66a of the rotor 66 on each other. For example, the mounting structure 10A of the first modification shown in FIG. 1B is utilized as the mounting structure 10C.

In the ninth modification, an inner peripheral portion 76 of the propeller boss 68a extends upward along the outer peripheral surface of the cylindrical portion 66a of the rotor 66. On the other hand, an upper portion of the cylindrical portion 66a is provided with a support member 22a extending outward from the cylindrical portion 66a in radial directions of the shaft 62 (see FIG. 6B).

Then, in the ninth modification, the first member 14 is the inner peripheral portion 76 of the propeller boss 68a, and the second member 16 is the cylindrical portion 66a of the rotor 66. In this case, the joining member 18 joins the inner peripheral portion 76 of the propeller boss 68a with the cylindrical portion 66a of the rotor 66. Further, the groove 24a is formed on the support member 22a at a place protruding outward from the inner peripheral portion 76 of the propeller boss 68a. Furthermore, the groove 28 is formed on the propeller boss 68a at a place facing the groove 24a of the support member 22a. Both ends of the first metal member 20 are respectively fitted in the grooves 24a, 28, so that the first metal member 20 is fastened to the support member 22a and the propeller boss 68a. Therefore, a portion of the first metal member 20 is in abutment on the inner peripheral portion 76 of the propeller boss 68a and restrains relative movement of the inner peripheral portion 76 of the propeller boss 68a with respect to the cylindrical portion 66a of the rotor 66 in a radial direction of the shaft 62.

Figure 6A:
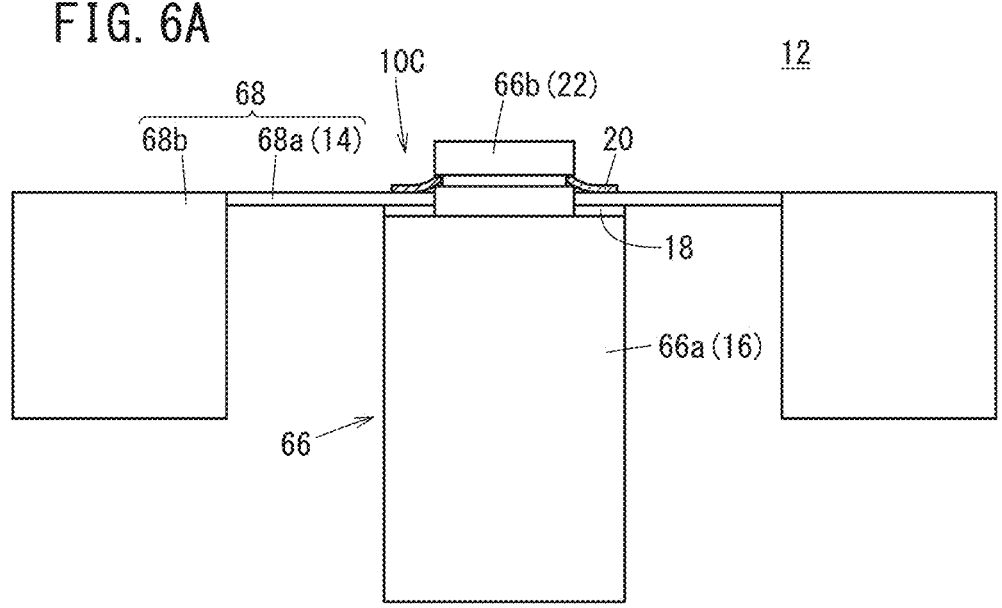
FIG. 6A is a side view of a cooling fan to which a mounting structure of a third embodiment is applied.
Figure 6B:
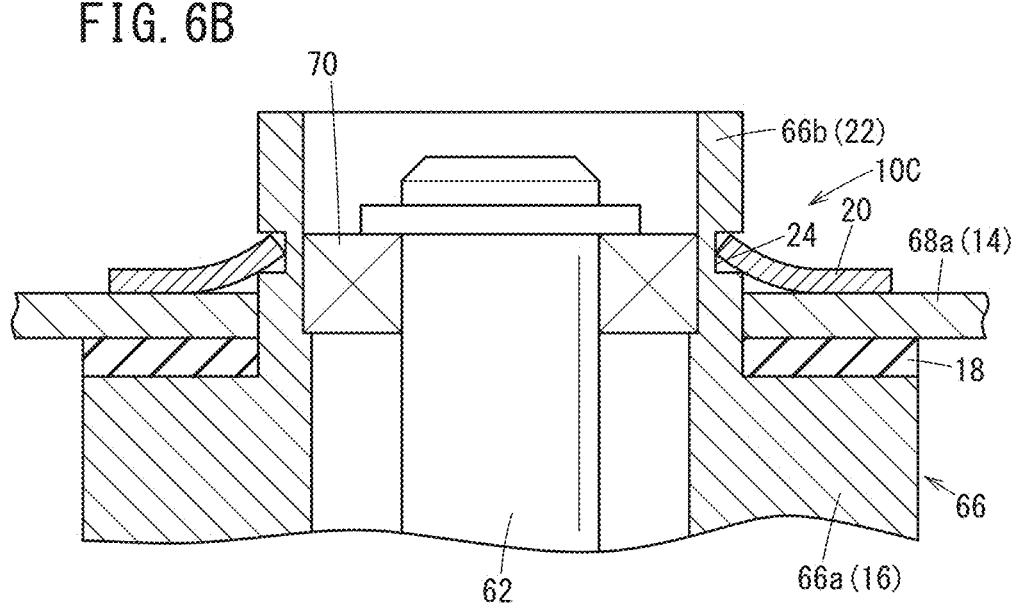
FIG. 6B is a partial cross-sectional view showing in an enlarged scale a portion of the mounting structure shown in FIG. 6A.
Figure 7:
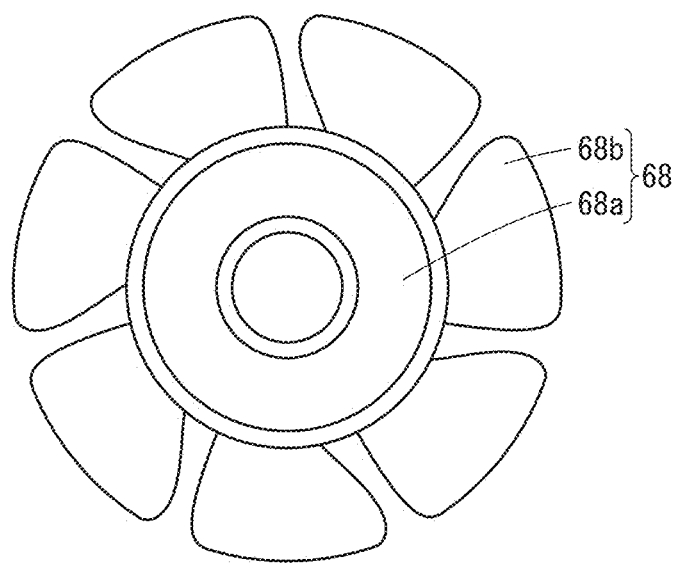
FIG. 7 is a plan view of a propeller shown in FIG. 6A.

The same effects as those of the mounting structure 10C shown in FIGS. 6A and 6B can be obtained also in the eighth and ninth modifications.

[Technical Idea or Concept Obtained from Embodiments]

A technical concept obtained from the aforementioned embodiments will be described hereafter.

A mounting structure (10A, 10C) is provided for mounting a first member (14) and a second member (16) on each other. The mounting structure (10A, 10C) is equipped with a rubber joining member (18, 18a, 18b) provided between the first member (14) and the second member (16), having a curing property and joining the first member (14) and the second member (16), and a first metal member (20) provided on the first member (14) on a side opposite to the joining member (18, 18a, 18b) and having an elastic force to restrict relative movement of the first member (14) with respect to the second member (16).

With the combination of the rubber joining member (18, 18a, 18b) having the curing property and the first metal member (20) having the elastic force, vibration having been transmitted to the first member (14) or to the second member (16) can be absorbed by the joining member (18, 18a, 18b) and the first metal member (20). Thus, it is possible to suppress (absorb) vibration transmitted from an outside in a simple configuration. Therefore, it is possible to secure vibration-proof, vibration resistance and damping properties. Further, because the first metal member (20) is able to reinforce the joining force between the first member (14) and the second member (16) by the joining member (18, 18a, 18b), it is possible to enhance the fastening force (joining force) between the first member (14) and the second member (16) and the capability of absorbing the vibration.

The second member (16) is provided with a support member (22, 22a, 22b) supporting the first metal member (20), and the first metal member (20) is fitted in a groove (24, 24a, 24b) formed on the support member (22, 22a, 22b).

With this configuration, the elastic force of the first metal member (20) presses the first member (14) toward the joining member (18, 18a, 18b) and the second member (16) and restricts the relative movement of the first member (14) to the second member (16). Further, because the vibration having been transmitted from the outside to the first member (14) is absorbed by the first metal member (20), the vibration transmitted to the second member (16) can be suppressed. Alternatively, because the vibration having been transmitted from the outside to the second member (16) is absorbed by the first metal member (20), the vibration transmitted to the first member (14) can be suppressed.

The mounting structure (10A to 10C) is further equipped with a second metal member (36) provided on the second member (16) on a side opposite to the joining member (18) and having an elastic force to restrict relative movement of the second member (16) with respect to the first member (14).

With this configuration, it is possible to restrict the relative movement between the first member (14) and the second member (16) by the use of the first metal member (20) and the second metal member (36). Further, because the vibration having been transmitted from the outside to the first member (14) is absorbed by the first metal member (20), the vibration transmitted to the second member (16) can be suppressed. Alternatively, because the vibration having been transmitted to the second member (16) is absorbed by the second metal member (36), the vibration transmitted to the first member (14) can be suppressed. As a result, it is possible to further increase the fastening force between the first member (14) and the second member (16) and the capability of absorbing the vibration.

The second member (16) is provided with a first support member (38a, 38b) supporting the first metal member (20), the first member (14) is provided with a second support member (42) supporting the second metal member (36), the first metal member (20) is fitted in a groove (40a, 40b) formed on the first support member (38a, 38b), and the second metal member (36) fitted in a groove (44) formed on the second support member (42).

With this configuration, by the use of the first metal member (20) and the second metal member (36), it is possible to further increase the fastening force between the first member (14) and the second member (16) and the capability of absorbing the vibration.

The mounting structure (10A, 10C) is further equipped with a penetrating member (30) penetrating through the first member (14) and the second member (16), the first metal member (20) is fitted in a first groove (32) formed on the penetrating member (30), and the second metal member (36) is fitted in a second groove (34) formed on the penetrating member (30).

Even in this case, by the use of the first metal member (20) and the second metal member (36), it is possible to further increase the fastening force between the first member (14) and the second member (16) and the capability of absorbing the vibration.

The mounting structures (10A, 10C) is equipped with a third member (46) provided between the first member (14) and the second member (16), and the joining member (18a, 18b) is provided between the first member (14) and the third member (46) and between the second member (16) and the third member (46).

With this configuration, it becomes possible to suitably use the first metal member (20) or the second metal member (36).

The mounting structures (10A, 10C) is further equipped with a third member (46) provided between the first member (14) and the second member (16), the joining member (18a, 18b) is provided between the first member (14) and the third member (46) and between the second member (16) and the third member (46), the third member (46) is provided with a support member (48) supporting the first metal member (20) and the second metal member (36), the first metal member (20) is fitted in a first groove (50) formed on the support member (48), and the second metal member (36) is fitted in a second groove (52) formed on the support member (48).

Even in this case, the first member (14) and the second member (16) are fastened by the elastic force of the joining member (18a, 18b) and each elastic force of the first metal member (20) and the second metal member (36), and the relative movement between the first member (14) and the second member (16) is restricted. As a result, it is possible to absorb the vibration transmitted to the first member (14), the second member (16) or the third member (46) respectively by the joining member (18a, 18B), the first metal member (20) and the second metal member (36).

A mounting structure (10B, 10C) is provided for mounting a first member (14) and a second member (16) on each other, with a portion of the first member (14) inserted into the second member (16). The mounting structure (10B, 10C) is equipped with a rubber joining member (18) provided between the first member (14) and the second member (16), having a curing property and joining the first member (14) and the second member (16), and a metal member (60) provided between the first member (14) and the second member (16) at a portion where the joining member (18) is not provided, the metal member (60) having elasticity for restricting relative movement of the first member (14) with respect to the second member (16) in an axial direction of the first member (14).

With this configuration, it is possible for the joining member (18) and the metal member (60) to absorb the vibration transmitted from the outside to the first member (14) or to the second member (16) due to the elastic forces of the joining member (18) and the metal member (60). As a result, the vibration transmitted from the outside can be suppressed (absorbed) in a simple configuration.

The metal member (60) is fitted in a groove (58) formed on the first member (14) and a groove (56) formed on the second member (16).

With this configuration, it is possible for the joining force applied by the joining member (18) between the first member (14) and the second member (16) to be reinforced by the elastic force of the metal member (60). At the same time, it is possible to effectively absorb the vibration transmitted to the first member (14) or to the second member (16) by the joining member (18) and the metal member (60).

The joining member (18, 18a, 18b) is an adhesive seal, a liquid gasket or elastic adhesive.

With this configuration, even in the case where it is not easy to secure the connected portion due to complicated contours of the first member (14) and the second member (16), it is possible to join the first member (14) and the second member (16) simply and easily, while absorbing the vibration. Further, even in the case where the first metal member (20), the second metal member (36) or an abutment portion of the metal member (60) against the first metal member (20) or the second metal member (36) is abraded by the use of the first metal member (20), the second metal member (36) or the metal member (60) for a long period of time, the joining force between the first member (14) and the second member (16) by the joining member (18, 18a, 18b) makes it possible to supplement the elastic force of the first metal member (20), the second metal member (36) or the metal member (60).

The metal member (20, 36, 60) is a leaf spring, a snap ring or a holder spring.

With this configuration, the elastic force of the metal member (20, 36, 60) is able to restrict the relative movement of the first member (14) to the second member (16) easily and reliably while supplementing the joining force (elastic force) of the joining member (18, 18a, 18b).

A cooling fan (12) has the mounting structure (10A to 10C) as described above.

With this configuration, it is possible to absorb vibration transmitted from the outside to the cooling fan (12) by the joining member (18, 18a, 18b) and the metal member (20, 36, 60). Therefore, the vibration-proof of the cooling fan (12) can be secured.

The cooling fan (12) is mounted on an electric motor for cooling the electric motor.

With this configuration, vibration transmitted from the electric motor to the cooling fan (12) can be effectively absorbed by the joining member (18, 18a, 18b) and the metal member (20, 36, 60).

The first member (14) and the second member (16) constitute at least one of combinations of a rotor (66) and a propeller (68) of the cooling fan (12), a propeller boss (68a) and blades (68b) of the propeller (68), and a case (64) and a shaft (62) of the cooling fan (12).

With this configuration, it is possible to reliably suppress (absorb) vibration transmitted from the electric motor to the cooling fan (12) or vibration transmitted from the propeller (68) to the rotor (66) by the joining member (18, 18a, 18b) and the metal member (20, 36, 60). For example, in the case where vibration is transmitted from the electric motor to the propeller (68) through the rotor (66) so that a moment load is generated on the propeller (68) by the weight and vibration acceleration of the propeller (68), the vibration caused by the moment load is absorbed by the joining member (18, 18a, 18b) and the metal member (20, 36, 60). Accordingly, it is possible to suppress the transmission of vibration to the rotor (66) and the shaft (62) and hence to prevent damages on the rotor (66) and the shaft (62).

Although certain preferred embodiments of the present invention have been shown and described in detail, it should be understood that various changes and modifications may be made therein without departing from the scope of the appended claims.

What is claimed is:

1. A cooling fan comprising:
   a rotor;
   a holding member held by the rotor; and
   a blade mounted on the holding member,
   wherein the holding member includes
     a first member that includes
       a first main surface and
       a second main surface that is on a side opposite to the first main surface,
     the blade includes a second member,
     the cooling fan comprises:
   a rubber joining member provided between the first main surface of the first member and the second member, and stuck and fixed to the first member and the second member, thereby elastically coupling the first member and the second member with each other; and
   a first metal member provided on the second main surface side of the first member and having an elastic force to press the first member in such a way that the first member presses the joining member and the second member, thereby restricting relative movement of the first member with respect to the second member,
   wherein the first member is movable and vibratable relative to the second member,
   the first member, the joining member, and the second member are arranged along a radial direction of the rotor in this order.

2. The cooling fan according to claim 1, wherein:
   the second member is provided with a support member supporting the first metal member; and
   the first metal member is fitted in a groove formed on the support member.

3. The cooling fan according to claim 1, further comprising:
   a second metal member provided on the second member on a side opposite to the joining member and having an elastic force to restrict relative movement of the second member with respect to the first member.

4. The cooling fan according to claim 3, wherein:
   the second member is provided with a first support member supporting the first metal member;
   the first member is provided with a second support member supporting the second metal member;
   the first metal member is fitted in a groove formed on the first support member; and
   the second metal member fitted in a groove formed on the second support member.

5. The cooling fan according to claim 3, further comprising:
   a penetrating member penetrating through the first member and the second member;

wherein:
the first metal member is fitted in a first groove formed on the penetrating member; and
the second metal member is fitted in a second groove formed on the penetrating member.

6. The cooling fan according to claim 1, further comprising:
a third member provided between the first member and the second member;
wherein:
the joining member includes a first joining member provided between the first member and the third member and a second joining member provided between the second member and the third member.

7. The cooling fan according to claim 3, further comprising:
a third member provided between the first member and the second member;
wherein:
the joining member includes a first joining member provided between the first member and the third member and a second joining member provided between the second member and the third member;
the third member is provided with a support member supporting the first metal member and the second metal member;
the first metal member is fitted in a first groove formed on the support member; and
the second metal member is fitted in a second groove formed on the support member.

8. The cooling fan according to claim 1, wherein:
the joining member is a seal, a double-sided seal or adhesive.

9. The cooling fan according to claim 1, wherein:
the metal member is a leaf spring, a snap ring or a holder spring.

10. The cooling fan according to claim 1, wherein:
the cooling fan is mounted on an electric motor for cooling the electric motor.

11. The cooling fan according to claim 1, wherein the joining member absorbs vibration in the radial direction transmitted from the rotor to the first member.

12. The cooling fan according to claim 1, wherein the first member is arranged on an outer peripheral side of the rotor with respect to the second member.

13. The cooling fan according to claim 12, wherein centrifugal force applied to the blade by rotation of the blade compresses the joining member.

14. The cooling fan according to claim 1, wherein the first member extends along an axial direction of the rotor, and the second member extends along the axial direction.

15. The cooling fan according to claim 2, wherein the support member extends along the radial direction of the rotor.

* * * * *